Sept. 27, 1949.　　　W. H. STONICH　　　2,483,072
FISH STRINGER
Filed June 30, 1948
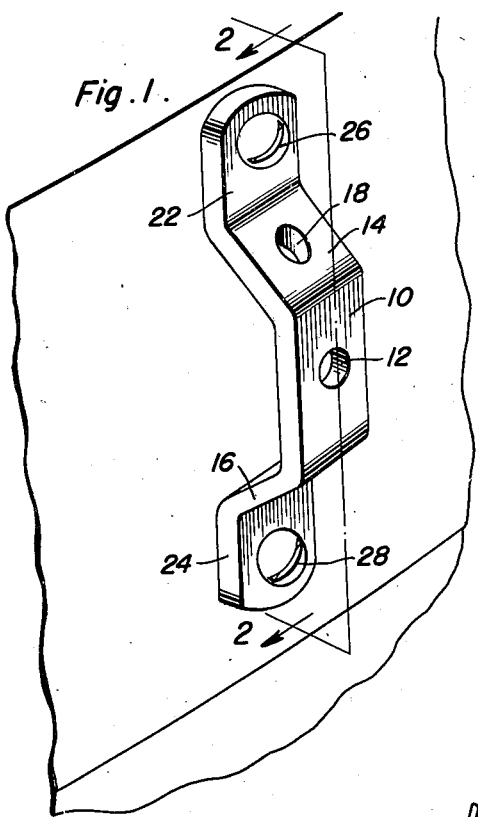
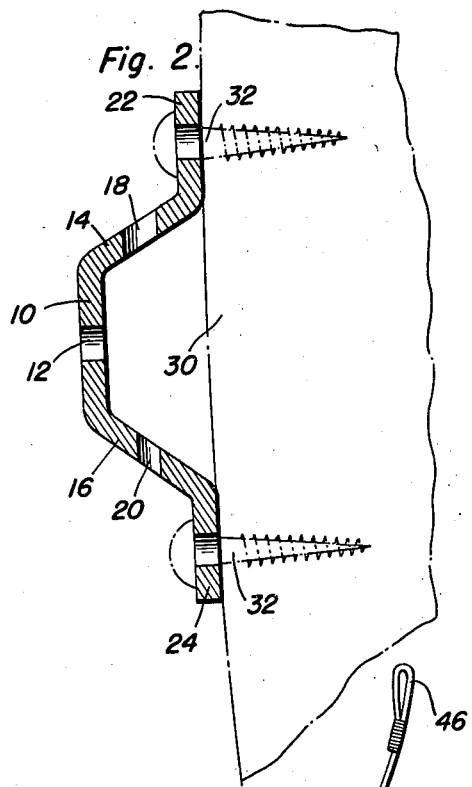
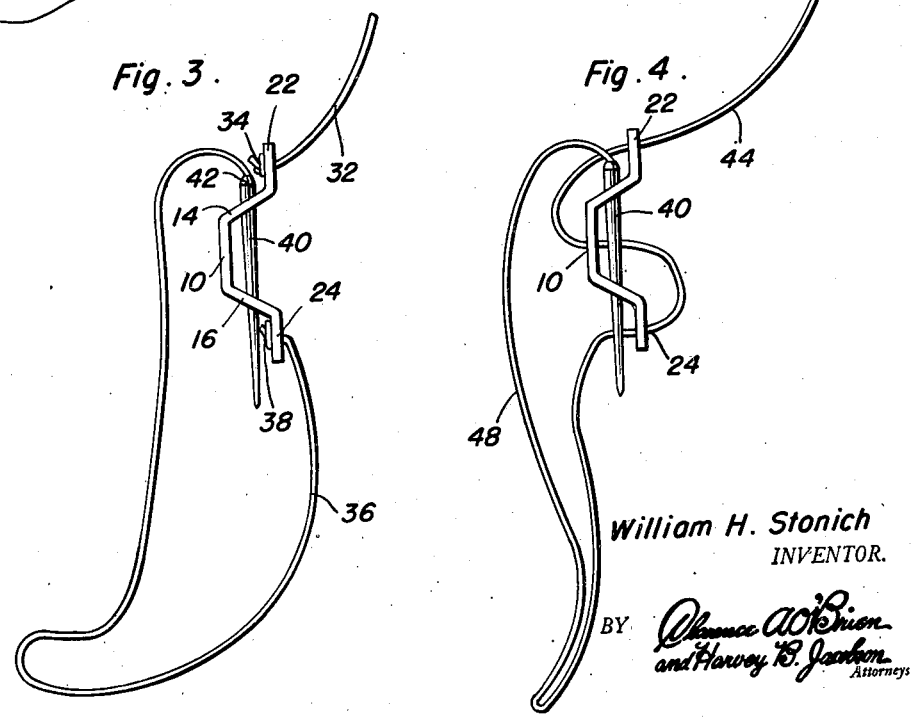
William H. Stonich
INVENTOR.

Patented Sept. 27, 1949

2,483,072

UNITED STATES PATENT OFFICE 2,483,072

FISH STRINGER

William H. Stonich, Boulder Junction, Wis.

Application June 30, 1948, Serial No. 36,103

3 Claims. (Cl. 224—7)

1

This invention comprises novel and useful improvements in a fish stringer and more particularly pertains to a fish stringing device of simplified and improved construction for retaining a string of fish.

The principal object of this invention is to provide an improved and advantageous construction of fish stringer whereby a string of fish may be more easily secured, may be more easily inserted upon or removed from the string, and wherein an improved fastening means for retaining the end of the string is provided.

Further objects of the invention reside in the provision of a fish stringer of a more simple, improved and light weight form, flexible, dependable in use and highly efficient for the purposes intended.

The principal feature of the invention resides in the provision of a U-shaped fastening bracket which is equally adapted for a rigid fastening upon the side of a boat or the like or for adjustable attachment to a stringer line and which is provided with improved means for retaining the end of the fish stringer line and for inserting or removing the end from the mouth and gills of fish.

These, together with various ancillary features and objects of the invention, which will later become apparent as the following description proceeds, are attained by this invention, preferred embodiments of which have been illustrated by way of example only in the accompanying drawings, wherein:

Figure 1 is a fragmentary perspective view showing the preferred embodiment of the invention mounted upon the side of a boat;

Figure 2 is a vertical longitudinal sectional view taken substantially upon the plane of the section line 2—2 of Figure 1;

Figure 3 is a side elevational view illustrating the manner of securing a fish stringer line to the holding bracket and an alternative manner of securing the holding bracket to a boat or other support; and, Figure 4 is a further side elevational view showing a modified manner of applying the bracket to a single flexible cable which constitutes both the fastening means of the bracket and the fish stringer line adapted for a detachable fastening engagement with the bracket.

Referring now more specifically to the accompanying drawings, wherein like numerals designate similar parts throughout the various views, attention is directed first to the showing of Figures 1 and 2 for an understanding of the

2 construction of the fastening bracket forming the essential feature of this invention. The fastening bracket, which is of any suitable material such as a metallic strap, a suitable plastic or other materials as desired, is shown as provided with a central flat portion 10, apertured as at 12, and from the sides of which extend angulated portions 14 and 16 forming obtuse angles with the portion 10, and provided with apertures 18 and 20.

The central portion 10 and the angulated portions 14 and 16 constitute a generally U-shaped bracket, the outer ends of which are turned outwardly to provide terminal portions 22 and 24, disposed in the same plane, apertured as at 26 and 28 respectively and which in the arrangement shown in Figures 1 and 2 are adapted to be secured to the side of a boat, indicated diagrammatically at 30, as by fastening screws 32.

The operation of this embodiment will be set forth hereinafter.

Attention is next directed to Figure 3 which shows a modified manner of mounting and using the fastening bracket shown in Figures 1 and 2. A flexible cable 32, is suitably attached at its upper end to a side of the boat in any suitable manner, not shown, and at its lower end is threaded through the aperture 26 of the terminal portion 22, and is retained therein as by a knot indicated at 34. Thus, the flexible cable 32 serves as a flexible support by means of which the bracket may be suspended from the sides of the boat. A fish stringer line, indicated at 36, has one end thereof threaded through the aperture 28 in the terminal portion 24 of the bracket, and is knotted as at 38 to prevent withdrawal of the same. The other end of this fish stringer line 36 has secured thereto in any desired manner a tapering point or terminal 40, whose upper end is bevelled or tapered as at 42 in the reverse direction to the taper of the point 40, and this terminal is adapted to be received in the aligned apertures 18 and 20 of the bracket. When so disposed, as shown in Figure 3, the main portion of the line 36 depends from the terminal 40 and from the knotted portion 38, and as will be understood it is intended that the point or needle 40 shall be inserted through the mouths and gills of fish, whereby the same may be strung upon the cable 36 and the weight of the fish when so mounted will be carried by the knotted portion 38 and will pull downwardly on the terminal point 40 as the latter is seated in the aligned socket apertures 18 and 20.

Alternatively, as shown in Figure 4, a single cable is provided for both supporting the bracket and for forming the fish stringer therewith. This cable indicated by the numeral 44 is provided preferably with a looped or eyelet portion 46 by means of which the cable may be suitably mounted upon or attached to the side of a boat, and this cable 44 is then threaded through the apertures 26, 12 and 28 in succession, as shown in Figure 4, and then turns to form a loop portion 48, the end of which is attached to the point or terminal 40 in exactly the same manner as illustrated in Figure 3. It will thus be seen that the portion of the cable 44 passing through the members 22, 10 and 24, is tightly gripped by reason of the change in direction or the angularity of the cable passing through these portions, whereby the supporting bracket is frictionally mounted upon and non-slidably secured upon the cable when a weight is carried by the bracket.

As will readily be apparent by reference to Figure 4, the bracket may thus be adjusted upward or downward upon the cable as desired, to properly position both the bracket and the string of fish carried and mounted upon the loop portion 48, as desired.

As will be apparent, the oppositely tapered ends of the terminal or point 40 provide means for readily threading the terminal through the mouth and gils of a fish and withdrawing the same as desired.

Referring now to the arrangement of Figures 1 and 2, it will be understood that a flexible cable is intended to be threaded through the aperture 12 and secured therein by any suitable manner as by a knot in the same way as the knot 38 of Figure 3. The end of the flexible cable being provided with the point 40, is then passed through the mouth and gills of a string of fish for securing the same, and the point 40 is then inserted and rests in the upper and lower apertures 18 and 20. As will be readily seen upon an inspection of Figure 2, it is contemplated that in the brackets, the apertures 18 and 20 shall be of relatively large and small diameters respectively, whereby the point is easily, snugly and frictionally engaged therein.

From the foregoing, the manner of supporting the bracket, and of fastening the fish stringer line thereto together with the advantages arising therefrom will be readily understood and further explanation is believed to be unnecessary.

However, since numerous modifications will readily occur to those skilled in the art after a consideration of the foregoing specification and accompanying drawings, it is not desired to limit the invention to the exact construction and arrangement shown and described, but all suitable modifications and equivalents may be resorted to, falling within the scope of the appended claims.

Having described the invention, what is claimed as new is:

1. A fish stringer comprising a bracket, means for supporting said bracket, a stringer line secured to and depending from said bracket, a terminal having reversely tapered ends secured in said stringer line, said terminal being seated in aligned apertures in said bracket, said bracket comprising a U-shaped member having a central portion with angulated legs on the opposite ends thereof, said legs terminating in flat aligned extremities and apertures in said central portion, angulated legs and said extremities.

2. The combination of claim 1 wherein a portion of said stringer line is engaged in one of said apertures.

3. A fish stringer comprising a flexible cable, a bracket slidably mounted upon and frictionally secured to said cable comprising aligned extremities and a parallel central portion terminally connected therebetween by angulated legs, apertures in said extremities, central portion and legs, said cable being threaded through the apertures of the extremities and central portion to provide a frictional fastening engagement and divide the cable to form a supporting portion and a fish stringer line, and a reversely tapered terminal on the end of said fish stringer portion engageable in the apertures of the angulated legs, the aperture of the upper leg being of larger size than that of the lower leg to compel insertion of the terminal therein from above.

WILLIAM H. STONICH.

REFERENCES CITED

The following references are of record in the file of this patent:

UNITED STATES PATENTS

| Number | Name | Date |
| --- | --- | --- |
| 849,410 | Mills | Apr. 9, 1907 |
| 2,424,658 | Hanson | July 29, 1947 |